Figure 1:
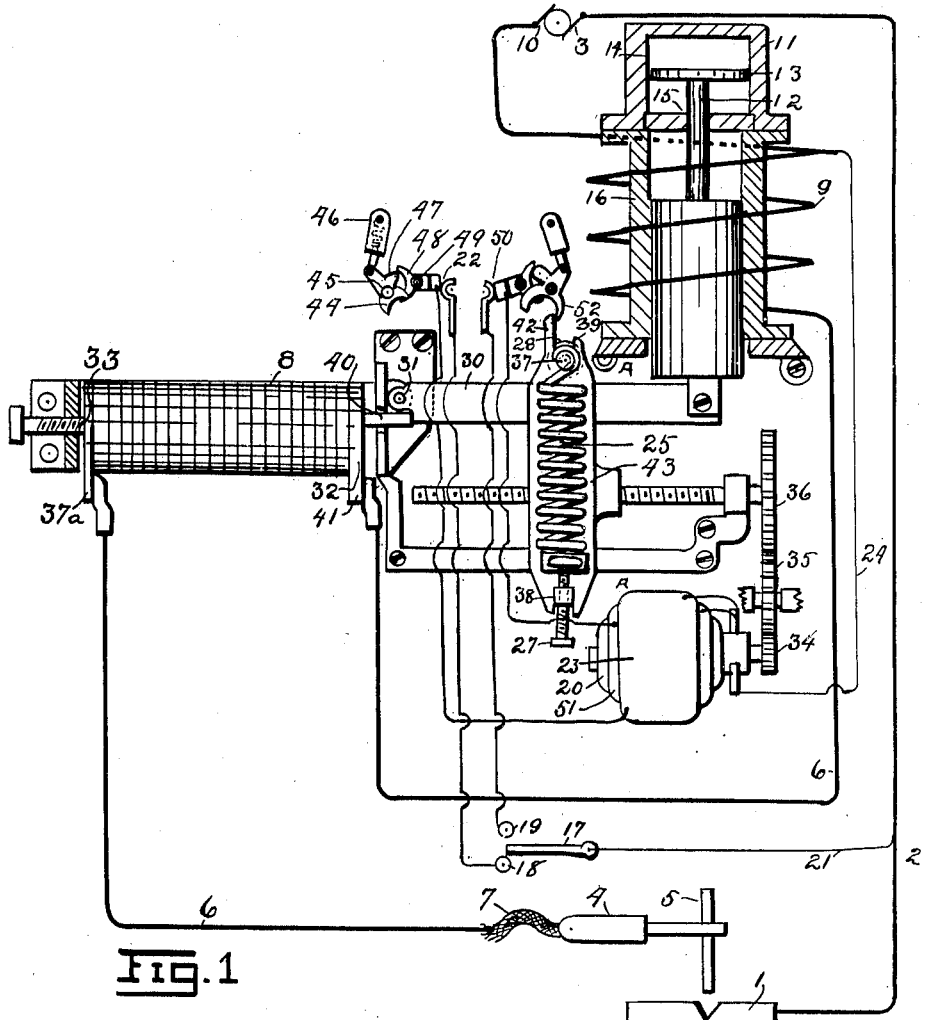

D. H. WILSON.
METHOD OF ELECTRIC WELDING.
APPLICATION FILED JULY 9, 1915. RENEWED MAY 10, 1916.

1,187,410.   Patented June 13, 1916.

WITNESSES:

INVENTOR.
David H. Wilson
BY Myron L. Hill
ATTORNEYS.

UNITED STATES PATENT OFFICE.

DAVID H. WILSON, OF PATERSON, NEW JERSEY.

METHOD OF ELECTRIC WELDING.

1,187,410. Specification of Letters Patent. Patented June 13, 1916.

Application filed July 9, 1915, Serial No. 39,012. Renewed May 10, 1916. Serial No. 96,537.

*To all whom it may concern:*

Be it known that I, DAVID H. WILSON, citizen of the United States, and resident of Paterson, in the county of Passaic and State of New Jersey, have invented certain new and useful Improvements in Methods of Electric Welding, of which the following is a specification.

My invention consists of a new method of electric welding with an arc.

It includes two features of the welding current, which may be used separately or jointly as desired, one feature relating to potential and the other to a critical temperature for the particular welding alloy used.

Heretofore, it has been the custom to employ a current of upward of 60 volts with which to start and maintain an arc. When the arc terminals have been brought into contact, resistance has been in the circuit to cut down the voltage of the arc to prevent a rush of current and a consequent boiling and spattering of metal from the welding electrode. As the arc has been drawn, it has been the aim heretofore to reduce the resistance in the circuit as the resistance of the arc increased. Since the potential of the current has been so high, the operator has been able to draw an arc of considerable length, the resistance in the circuit being reduced correspondingly, before the arc breaks. In other words, the operator has been allowed wide limits of potential and length of arc with which to perform the welding operations. While it has been possible to cut down at the arc terminals, the comparatively high voltages used at the generator, the automatic resistance varying devices in the circuit have permitted the operator's drawing long high temperature arcs between the terminals.

One objection of the long burning arc has been the violent electrical action upon the welding metal, preventing an even flow of metal from the welding electrode across the arc to the work and damaging the character of the weld. It is easier for an operator to weld with a long high voltage arc than with a low voltage one. The arc from a high voltage circuit breaks less easily since it may be varied in length much more than that from a low voltage circuit. When the current on the mains has a high voltage, the result is that while there may be wide fluctuations a long burning arc prevails. The damaging effect of the long hot arc has not been understood heretofore. Large amperages have contributed to the damage. The heat of the arc results in the formation in the joint of small craters surrounded by slag thus damaging the weld. Sometimes a comparatively small variation of the current causes the formation of craters and slag. Furthermore, if the heat of the arc is reduced below the proper temperature, the welding metal fails to adhere to the work. Furthermore, the long arc causes a violent electrical action on the flow of metal preventing a smooth regular flow.

My invention has for one of its objects the reduction of the voltage and heat limits by providing a continuously low potential current at a proper amperage with a consequently narrower range of resistance and with a correspondingly narrow variation of the length, potential and heat of the welding arc thereby preventing the operator from welding with the long burning arc and thus injuring the welding metal. For example, I supply a current having a voltage of 18 to 24 or thereabout across the arc terminals. To allow for the drop of voltage due to line connections and conductors a main line constant potential of 35 volts or thereabout is satisfactory.

By employing such a current for arc welding, the resistance of the welding terminals is sufficient to check any undue rush of current particularly if both are fusible welding metals adapted to flow and create a solid welded joint; and yet there is sufficient voltage with which to draw the arc. With such a current subsequent reduction of circuit resistance is unnecessary. In fact, I find it desirable to increase the circuit resistance if too great an amperage is supplied over the mains, to a point that will permit the flow of the desired current for the proper welding heat. The best heat for the arc varies somewhat owing to the conductivity and melting temperatures of the different metals that may be subjected to welding, as well as to the size of the welding electrode.

Another object of my invention is to perform a welding operation by means of a current that will create the temperature best suited for welding. Metals and alloys have what may be called critical temperatures, that is, temperatures at which they may be used for welding purposes with the best results. Some metals have one temperature and other metals have other temperatures. The critical temperatures of the welding metals vary with the different constituents, or some of them, of which they are composed. The size of the wire may also affect these factors.

The temperature of the arc depends upon the watts of current traversing the arc. The critical temperature may be attained by varying either the potential or the current. Since it is objectionable to use a high potential, it is better to secure the critical temperature by a variation of the amperage of the current. For example, the critical temperature for a welding electrode composed of steel wire, .15" in diameter, having about .20% carbon, and .40% manganese, is obtained by employing a current having an amperage of about 125 at the potential above described. As the size of the welding wire increases, there is a tendency for the portions of the wire near its perimeter to become too hot and slag formation and weakened welds result. So that a small welding wire has advantages over a large one. .15" wire gives excellent results flowing as a mass in an even plastic state across the arc.

My invention which consists first in the low voltage current from the generator which prevents the formation of the long burning arc; and second, the maintenance of the heat of the arc at substantially the critical temperature of the welding alloy under the conditions of use, eliminates many obstacles and assists in the attainment of a substantially perfect weld. The critical temperature is such as will cause the transfer of metal across the arc in a more or less plastic state.

I have discovered that arc welding fluxes are not only useless but positively detrimental for low potential welding.

One of the objects of my method is to provide the facilities for an even and smooth flow of metal so that the metal which leaves the electrode is deposited upon the work with the least possible alteration in its character.

Tests have been made of many different fluxes. When a flux is used in arc welding, the materials in the flux are carried into the weld and weaken it; so that instead of scavenging the welded metal as intended, they add impurities to it. My low voltage welding current overcomes the difficulties heretofore encountered in securing a pure weld without the use of a flux. Means, including fluxes, have also been employed to surround the welding arc with a blanket of gas of such a character as to prevent high oxidation. Such means have been useless for the purpose of assisting in arc welding operations.

My method which permits the elimination of fluxes and gas blankets accomplishes the most perfect weld that has so far been attained.

Figure 2:
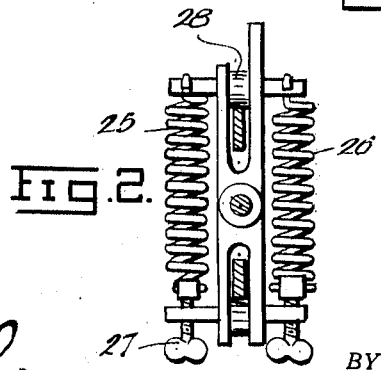

In the drawings: Figure 1 shows a diagram of the circuits and apparatus capable of supplying an even current. Fig. 2 shows a section upon line A—A in Fig. 1.

In Fig. 1 is shown a piece of metal 1, constituting the work. This piece of metal may be fractured as shown; and it may be part of a boiler or other piece of mechanism or apparatus intended for repair. It may represent a part intended for joining in a manufacturing process, or it may be any material to which my invention may be applied. This piece of metal 1, is connected through the conductor 2 to the source of welding current 3 which may, for example, be the negative pole of a bipolar generator. The tool holder 4 is adapted to have secured to it a metal electrode 5, which may be of any suitable steel or alloy, in electrical connection with the conductor 6, which may be a cable as indicated at 7. This conductor 5 is connected through the main regulating pile 8 and solenoid 9 to the positive pole 10 of the generator.

The operation of the solenoid 8 is delayed by the dash pot 11. To the core of the solenoid is secured a rod 12 at the other end of which is fixed a plate 13 fitting freely within the cylinder 14, forming the dash pot. The rod 12 passes through the bearing 15 of the dash pot, which, as shown, may be mounted on the top of the solenoid spool 16 and secured thereto by any suitable means. Any other suitable device may be used to delay the action of the solenoid. The object of this delay is to maintain the circuit of the carbon pile at a low resistance until the operator has had an opportunity to separate the welding tool 5 from the work 1. During the drawing of the arc or soon after, the solenoid overcomes the dash pot and increases the resistance up to the requirements of the welding arc.

It is thus apparent that when the electrode 5 is brought into contact with the metal work 1, the circuit established from the sources of electric current 3 and 10 over the circuits above described, permits the passage first of an amount of current sufficient to establish the desired arc. The current is then reduced after the terminals become heated, the pile resistance being increased for the purpose. It may preferably be adjusted to supply a variable amount of current from say, 200 amperes, down to any amount, say, 25, that may be desired by the operator. In order that he may select the amount of current he desires, the operator is provided with a switch 17 having an arm adapted to come into contact with either one of the two contacts 18 or 19. If the operator closes the circuit from the switch 17 to the contact 18, he selects the desired normal resistance of the pile by operating the motor 20 in the following circuit; source of current 3, conductors 2 and 21, switch 17, contact 18, circuit closer 22, field coil 23 of the motor, the armature of the motor, conductor 24, to the terminal 10. This circuit causes the motor to rotate in such a direction as to advance springs 25 and 26 or other resilient means, to the left in the figure so that the rollers 27 and 28 travel toward the pile 9, the roller 27 traveling upon the fixed track 29 and the roller 28 upon the lever 30 (which is fulcrumed upon the fixed pivot 31 and engages the end 32 of the pile 9) so that the spring exerts a reduced compression upon the pile against the adjustable abutment 33, thereby increasing the resistance of the pile. In this apparatus, the motor 20 is provided with a pinion 34, driving the gear wheels 35 and 36. The springs 25 and 26 are fastened to the journals 37 and 38 of the rollers 27 and 28, tending to pull them toward each other. The upper journal 37 is adapted to freely slide in the slot 39 so that the roller is adapted to exert a fairly constant pressure upon the lever 30 and a varying pressure upon the pile. This lever is fulcrumed at 31 and engages end plate 41 of the pile. The plate exerts a pressure upon the pile, pressing the various disks of the pile into closer engagement and against the adjustable abutment 33. It will be seen that the operator in closing the switch lever 17 to the contact 18 may cause the springs 25 and 26 to be carried along the lever 30, so that the while its tension or pull is not greatly altered, its effect upon the pile is greatly altered. In this way, the operator is enabled to vary the amount of current supplied through the pile.

If the operator leaves the switch 17 in engagement with the contact 18 too long, the lug 42 upon the carrier 43 engages an automatic circuit breaking lever 44 pivoted at 45 and switches it to the left against the compression spring 46 until the pressure of the spring is exerted in a direction to the right of the pivot 45 thus throwing the lever over. This causes the arm 47 to engage lever 48 pivoted at 49 and causes it to break the circuit between the contacts 22, so that the motor 20 stops working. When the operator desires more current for his work, he shifts the lever 17 to the contact 19, thereby switching the current from the winding 23 of the field of the motor to the winding 51 of the field of the motor, causing the motor to rotate in the opposite direction. The motor now operates the traveler 43 to the right and causes the springs 25 and 26 to increase the pressure upon the pile, thereby reducing its resistance and increasing the current therethrough. To prevent the operator from injuring the construction by a too prolonged operation of the motor, the lug 42 engages the lever 52, thereby opening the pair of contacts 50 thereby opening the circuit of the motor and stopping its action. When the motor is reversed, the lug 42 engages the opposite arms of the levers 52 and 44, thereupon closing the circuits at 22 or 50 as the case may be. After the operator has adjusted the carbon pile in order to supply the tool with the average quantity of current desired for his work, the main regulating solenoid 9 maintains the current so that it is substantially even at all times. The operator may adjust the pressure upon the pile so that at all times the disks of the pile are in such intimate contact with each other as to avoid sparking or injurious heating. If the carbon disks should not make uniform contact throughout their surfaces, there would result a detrimental local heating at the points of contact.

The more uniform the contact is throughout the area of the disks, the greater the amount of current which can pass through the disks without injurious heating and the less the consumption of the pile and the greater its life. We have found it desirable to employ a substantial pressure upon the disks as a minimum pressure, and to vary the same to a substantially high pressure.

The spring pressure upon the lever, which transfers the pressure to the carbon pile, may if desired, be fifty pounds or more. As the spring travels away from or toward the fulcrum, the pressure upon the pile tends to be correspondingly varied. When the solenoid is energized, the pressure upon the disks is affected to an extent determined by the amount of current flowing through the solenoid winding. The pressure of the spring action upon the pile, however, is not entirely removed, since the solenoid action is never strong enough to overcome the full force of the traveling spring. I do not limit my invention to these specific pressures for various other pressures may be employed, all depending upon the amount of current to be acommodated and the capacity of the pile. The object of the construction just referred to is to keep the disks of the pile in such intimate or uniform contact throughout their surfaces as to prevent injurious heating under all conditions of use.

If the resistance at the arc increases, due to the uncertainty of the operator's manipulation of the tool, it causes a reduction of the flow of current through the solenoid, which exerts a smaller pull upon its core resulting in a lighter pull upon the outer end of the lever, so that the carbon pile is subjected to more compression from the springs 25 and 26. When, however, the resistance of the welding arc decreases, more current flows through the regulating solenoid 9, and thereby the current supplied therethrough to the tool. This regulating action takes place regardless of the particular location of the springs 25 and 26 with relation to the lever 30. In this way the average current traversing the welding arc is maintained uniform in its heating effect. When the operator breaks the circuit at the welding arc, the solenoid 9 releases its core, causing the pile resistance to be reduced to practically nothing which is equivalent to throwing the pile out of circuit.

The end plates 32 and 37ª may be copper or they may be carbon copper plated, or they may be any other suitable material.

When the terminals 1 and 5 are brought into contact, they are heated readily by the current employed and a substantial arc is drawn. The pile resistance is then increased as or after the terminals are separated, until the increasing resistance of the pile and of the arc regulate the desired current flow to the amount provided by the location of springs 25 and 26 and the solenoid pull. This amount is subjected to variation by the switch 17 and motor 20 as heretofore described.

While the pile is normally in the electric circuit, its resistance is so low as to be negligible, and for all practical purposes at the moment when the terminals are brought into contact, the pile might just as well be entirely out of circuit. The period of time of the contact is sufficiently short with the low voltage current employed, to prevent an objectionable flow of current.

One of the great advantages of my method of welding is the substantial elimination of buckling, and shrinkage of the dimensions of the work operated upon. Heretofore, when the hot arc has been employed upon work consisting, for example, of two sheets of metal each a foot wide and a half inch thick, being welded together at their edges, the sheet after welding buckles so badly that its outer edges are deflected out of the proper plane as much as an inch or two. By means of my method, this buckling is so far removed that the outer edges remain within one-eighth of an inch of their correct plane. The same warping action also takes place in other classes of welding when the long burning arc is employed but when my method is applied, the articles remain substantially true and close to their original dimensions.

Many variations may be made in the apparatus employed to secure the foregoing results.

Some of the features of my invention may be omitted without losing the advantages of other features. My invention is more clearly defined in the combinations set forth in the claims.

The burning quality of the arc, and the various imperfections in the weld do not destroy the usefulness of the weld, since in spite of such defects, it is useful for purposes where full strength qualities are not essential. My invention aims to extend the range of usefulness of arc welding.

What I claim is:

1. The method of electric welding which consists of starting an arc with the maximum potential of the welding current, said current being limited to a non-pitting potential.

2. The method of electric welding which consists of transferring welding metal from the welding electrode to the work continuously by a current whose potential is substantially limited to a degree that prevents the formation of slag.

3. The method of electric arc welding between electrodes of fusible welding metals which consists in transferring the welding metal from one electrode to another across an arc caused by an electric current of such low voltage as to substantially eliminate the spattering of metal.

4. The method of electric arc welding between electrodes of fusible welding metals which consists in transferring the welding metal from one electrode to another across an arc caused by an electric current of such low voltage as to substantially eliminate the spattering of metal due to high voltage currents reduced by artificial resistance, said current also having such proportions as will create the temperature in the arc which is critical to the welding alloy employed.

5. The method of welding with an arc between electrodes of fusible metals which consists of supplying a current from a source having a maximum potential sufficiently low to prevent boiling and spattering of metal.

6. The method of welding with an arc between electrodes of fusible metals which consists of supplying a current from a source having a maximum potential sufficiently low to prevent the drawing of a long burning arc.

7. The method of welding with a welding electrode and an arc which consists in causing welding metal to flow from the welding electrode to the work across an arc having substantially the critical temperature at which the best welding operations for the particular welding metal occur.

8. The method of welding with a welding electrode and an arc which consists in causing welding metal to flow from the welding electrode to the work across an arc having substantially the critical temperature at which the best welding operation for the particular welding metal occurs the potential and current values remaining substantially constant.

9. The method of electric welding which consists in transferring welding metal across an arc by means of a continuously low voltage current adapted to prevent burning.

10. The method of electric welding which consists in transferring a flux free welding metal across an arc by means of a continuously low voltage current adapted to prevent burning.

11. The method of electric welding which consists in transferring welding metal across an arc free from slag by means of a continuously low voltage current.

12. The method of electric welding which consists in transferring welding metal across an arc in a plastic state.

Signed at New York, in the county of New York and State of New York this 2nd day of June, A. D. 1915.

DAVID H. WILSON.

Witnesses:
 WM. W. WILLIAMS,
 A. L. TRAVIS.